UNITED STATES PATENT OFFICE.

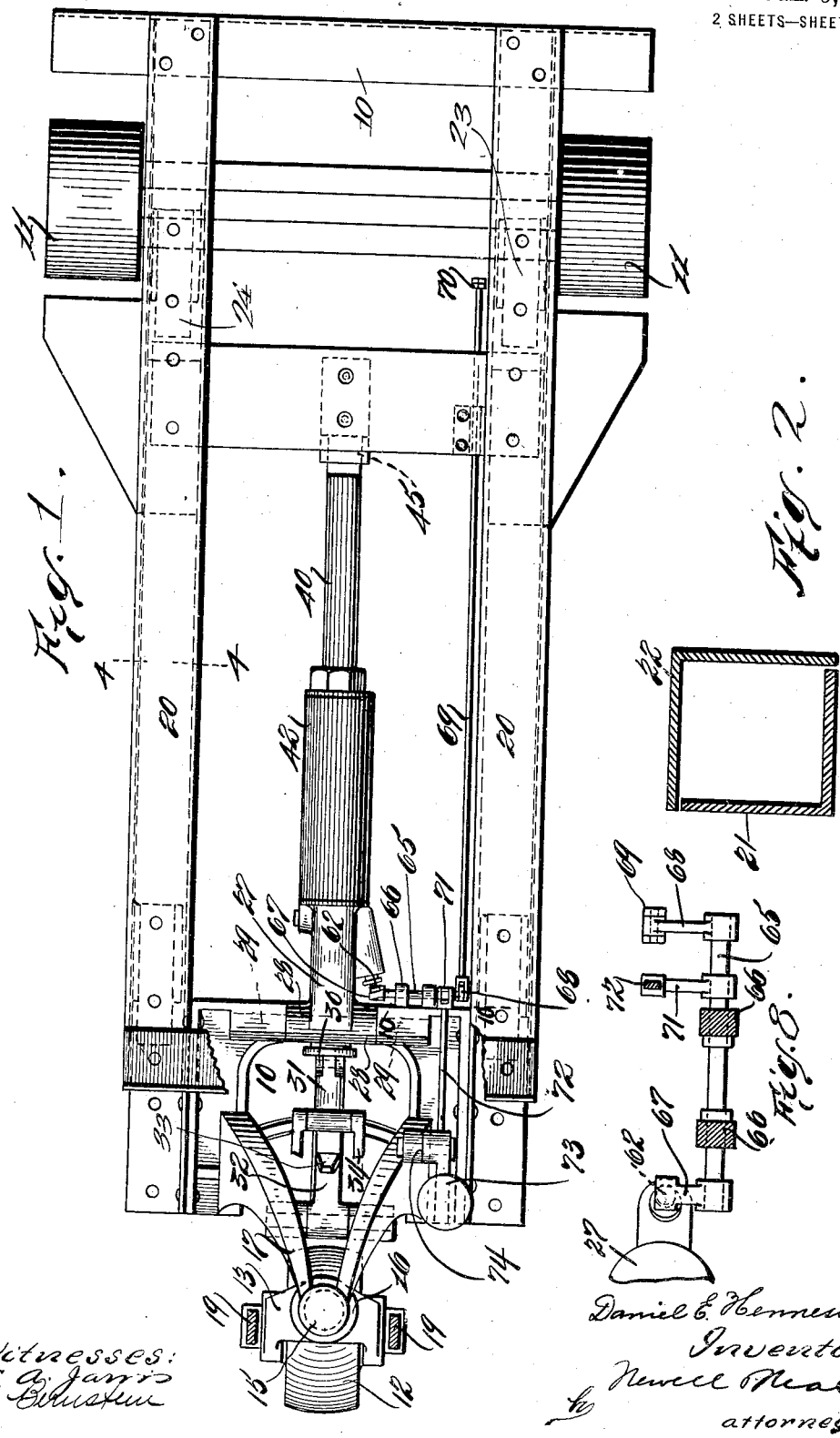

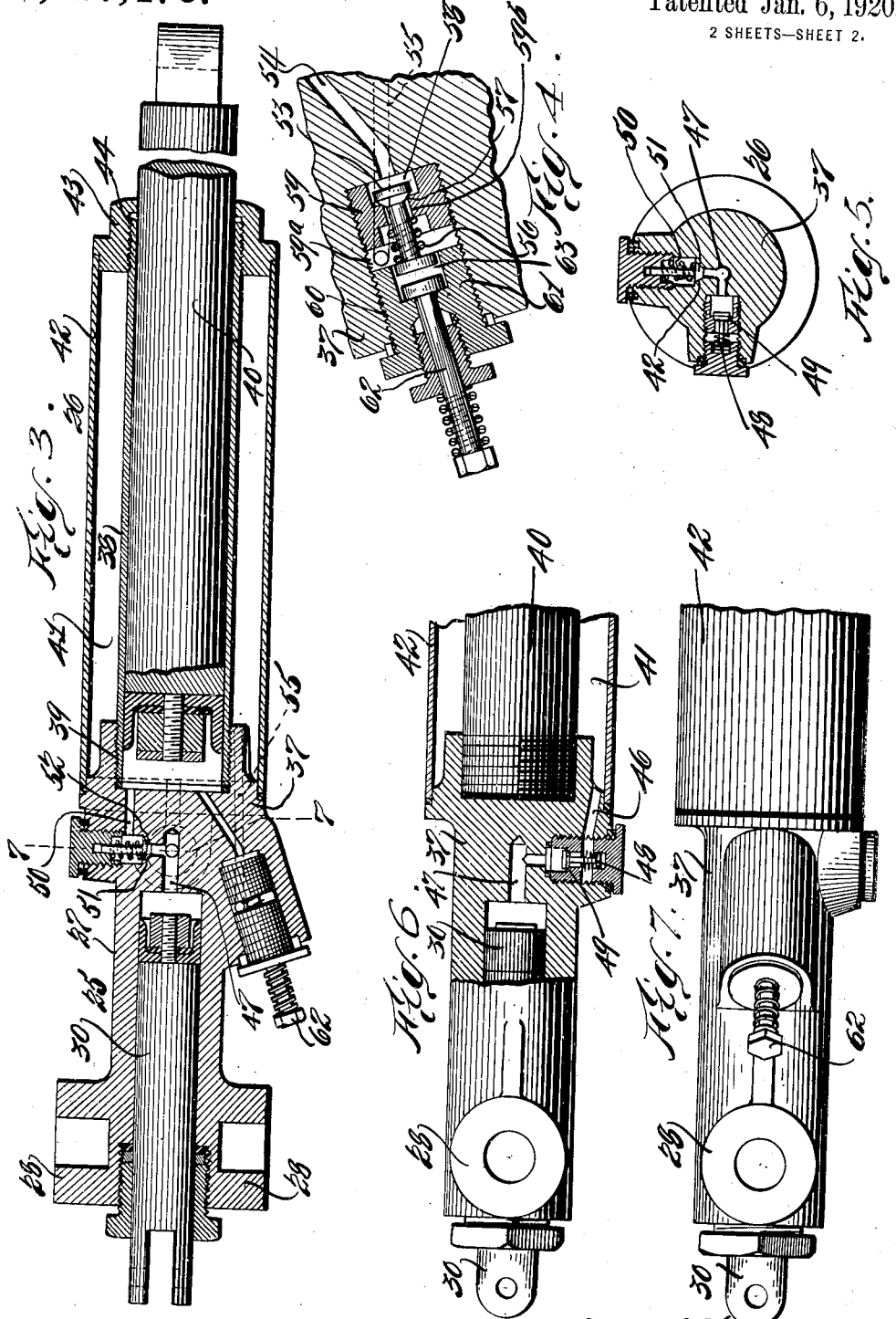

DANIEL E. HENNESSY, OF HOLYOKE, MASSACHUSETTS, ASSIGNOR TO HERBERT W. COWAN, J. LEWIS WYCKOFF, AND EDWARD N. WHITE, TRUSTEES, DOING BUSINESS AS COWAN TRUCK COMPANY.

HYDRAULIC JACK.

1,327,470.  Specification of Letters Patent.  Patented Jan. 6, 1920.

Application filed June 23, 1914, Serial No. 846,731. Renewed October 3, 1917. Serial No. 194,591.

*To all whom it may concern:*

Be it known that I, DANIEL E. HENNESSY, a citizen of the United States, residing at Holyoke, county of Hampden, and State of Massachusetts, have invented certain new and useful Improvements in Hydraulic Jacks, of which the following is a clear, full, and exact description.

This invention relates to elevating devices such as elevating trucks, and has for one of its objects improved means for shutting off the action of the intermittently operable mechanism, such as a fluid-operated jack, when the platform is sufficiently raised. Other objects of the invention are to provide a simple, practical and efficient device of the class described.

These being among the objects of the present invention, the same consists of certain features of construction and combinations of parts to be hereinafter described and then claimed with reference to the accompanying drawings illustrating suitable embodiments of the invention, and in which—

Figure 1 is a plan view;

Fig. 2 is an enlarged transverse section on the line 4—4 Fig. 1;

Fig. 3 is an enlarged longitudinal section of the preferred pump and jack;

Fig. 4 is an enlarged detail section of a relief valve mechanism;

Fig. 5 is a transverse section on the line 7—7 Fig. 3;

Fig. 6 is a broken detail section of the pump and jack taken at right angles to Fig. 3;

Fig. 7 is a side elevation of the pump and a part of the jack; and

Fig. 8 is an enlarged transverse section partly in elevation on line 10—10 Fig. 1, showing the preferred relief valve actuator.

Referring to Fig. 1, the base 10 of the truck is provided with rear wheels 11 and a front caster wheel 12, which is supported in a frame 13 by means of an axle pin. Said caster frame is provided with a vertical swivel pin 15 which journals in a suitable bearing 16 in a bracket 17 extending upwardly and forwardly from the base 10. Means for moving the truck comprise a tongue or handle, which also is adapted to constitute an operating lever for a pump, and is provided with bifurcations 19 which are perforated to receive the ends of the axle pin upon which the said tongue may be swung vertically. The platform 20 of the truck may be of any suitable construction, and its side bars 21 and the side bars 22 of the base may be formed of angle metal as illustrated in Fig. 4.

The platform normally rests upon the base and may be raised or lowered through the intervention of suitable mechanism. Obviously the platform may be raised directly upwardly and lowered directly downwardly relatively to the base, but in the preferred form of the present invention the platform is adapted to be raised through the application of power which is so applied through the intervention of suitable mechanism between the base and the platform, that the platform is elevated and at the same time the base and platform are shifted longitudinally relatively to each other. Any suitable means may be used for this purpose, a detailed illustration of this means not being essential to an understanding of the invention.

Suitable power means are more particularly shown in Figs. 3 to 7 inclusive. A pump 25 and a fluid-operated jack 26 are the main parts involved in connection with the illustrated power mechanism. Said pump is provided with a cylinder 27, which at its front end is provided with lateral bearing sockets 28, 28, which receive suitable pivot pins 29, 29 rigidly mounted on the front portion of the base as shown in Fig. 1. The piston 30, which reciprocates in the cylinder 27, may be operated in any suitable manner, but preferably by means of the handle of the truck. To this end the said piston 30 is pivotally connected by a link 31 to a lever 32, which is pivoted to the extension 17 of the base, the upper end of said lever carrying a link 34. The link 34 is provided with a recessed keeper, which is adapted to be engaged with a pin on the truck handle. When the handle is free from said keeper the truck may be steered thereby, but when it is engaged with said keeper the piston 30 of the pump may be reciprocated by the oscillation of said handle, which serves as a hand lever. To prevent injury to the pump from too great strokes of the operating handle, particularly as the jack swings about the pivots 29, the lever 32 is provided with stops 33 which engage parts of the frame and limit the movements of said lever in both directions. At the rear end of the pump cylinder 27 is a head 37, which is in common with, and also serves as a head for, the jack 26.

The jack 26 comprises a ram cylinder 38, which is provided with a screw connection with the head 37 at 39, a ram 40 operating in said cylinder, and a fluid supply chamber 41, which may be formed by a cylindrical shell 42 placed outside of the ram cylinder, and a nut 43 having a screw connection at 44 with said ram cylinder. As shown in Fig. 1, the said ram is pivotally connected at 45 with the rear end of the platform 20. The object of the ram and pump is to produce, by a reciprocation of the pump piston 30, an intermittent advancing motion of the ram 40, and thereby apply lifting power to the platform to enable the latter to be directed upwardly by the co-acting inclined members before mentioned.

As shown more fully in Fig. 6, the common head 37 for the pump and jack is provided with a passage 46 leading from the supply chamber 41 to the pump cylinder 27. A portion 47 of this passage extends axially through the head 37. Said passage 46 is controlled by means of a suitable spring-actuated valve 48, which is adapted to seat rearwardly against valve seat 49, in the direction of the supply chamber 41, so that a forward movement of the piston 30 will suck fluid into the pump cylinder, whereas a backward movement of the piston will cause the fluid to close the valve 48. As shown in Fig. 3, the axial passage 47 before mentioned is connected by means of a passage 50 with the interior of the ram cylinder 38. Said passage 50 is controlled by means of a valve 51 which is spring-pressed, and is adapted to close against the seat 52 which is presented in the direction of the ram cylinder, so that when the pump piston 30 is moved rearwardly it will cause the charge of fluid in the pump cylinder to act to automatically open the valve 51 and to pass into the ram cylinder 38, therefore actuating the ram.

It will be seen that the pump and the jack lie substantially horizontal when the platform of the truck is lowered, but when power is applied to reciprocate the pump piston, the ram is moved so as to raise the platform, said platform being caused to move in parallelism to itself or edgewise by reason of the action of the inclined members between the platform and base. A careful operator of the hand lever would probably know when the platform is sufficiently raised, but the ordinary or careless operator might not. To provide against injury to the mechanism, a control device is installed which is adapted to stop the action of the jack automatically when the platform is raised to the proper height, and whi may be suitably actuated.

The preferred control device mentic___ is fully shown in Figs. 3 and 4. It comprises a valve 53 located in such position between passages 54, 55, in the head 37 as to control said passages. Said valve is normally retracted by a spring 56 which seats the same against a valve seat 57 which is formed in the small valve chamber 58 in a plug 59, which is screwed into a screw-threaded opening 60 in the head 37, and which opening is inclined with respect to the longitudinal axis of the pump. The passage 54 leads from the interior of the ram cylinder 38 to the valve chamber 58, and the passage 55 leads from a chamber 59$^a$ to the chamber 41 around the jack. It will be seen that the said valve 53 which constitutes a relief valve is forced against its seat by the pumping action, so that the chamber 41 is normally closed by the effect of the pumping action. Said screw-threaded opening 60 also receives a screw-threaded plug 61 which is screwed into it after the plug 59 has been screwed home, and said plug 61 carries a spring-actuated plunger 62, the inner end of which is guided in as enlarged recess 63 in said plug 61, into which recess the adjacent end of the stem of valve 53 extends, but the said adjacent ends are normally separated by a space. Said chamber 59$^a$ is formed by leaving a space between the two plugs 59 and 61, and said chamber 59$^a$ communicates with valve chamber 58 by means of a port 59$^b$ controlled by valve 53. It will be seen that if at any time the plunger 62 is pressed inwardly against the stem of valve 53, the latter will be moved away from its seat so as to open the port 59$^b$.

The retaining plug 61 of the control device and the plug 59 carrying the valve 53, being arranged upon the outer peripheral wall of the common head between the pump and jack, constitute freely accessible means, the removal of which enables free access to the said valve whenever desired, as access to them is not hindered by any obstructing exterior parts. This feature of accessibility is also true as to the valves 48 and 51, inasmuch as screw plugs 48$^a$ and 51$^a$ are screwed into the outer peripheral wall of the common head so as to hold the valves in place and render them accessible. Preferably the plugs 61, 48$^a$ and 51$^a$, in order to dispose them in a more convenient position for removal and insertion, extend away from the main axis of the common head, and the screw sockets for receiving said plugs are of course likewise disposed.

Suitable means may be provided for actuating the plunger 62 of the described control device, such for instance as shown in Figs. 1 and 8. To this end a rock shaft 65 is journaled in suitable bearings 66 located upon the front portion of the base 10 of the truck, and said rock-shaft 65 carries a tappet or actuator 67. Said tappet or actuator is located in such position with respect to the plunger 62 of the control device that it is adapted to press on and operate said plunger. An arm 68 is mounted on rock-shaft 65 and is pivotally connected with a rod 69 which extends rearwardly of the truck and is loosely connected with the platform at 70. It will be seen that by means of the said rod 69 which is moved by the platform as the same is raised and shifted rearwardly, the rock-shaft 65 is oscillated, and even though the operator continues to pump, the actuator 67 will be brought in contact with the outer end of the plunger 62 and the latter pushed inwardly. This movement of the plunger will cause it to move the valve 53 away from its seat and thus open the port 59$^b$ so that a by-pass is provided between the chamber of the ram cylinder 38 and the chamber 41, and the pumped fluid will be forced into said chamber 41. This will automatically shut off the action of the intermittently actuated mechanism or jack, and prevent the platform from being raised any higher.

As an alternative means for operating the actuator 67 and as means for releasing the jack, the manually operated means shown in Fig. 1 may be used, but the action is not automatic. To this end there is connected with a rock-arm 71 on the shaft 65 a link 72 which extends forwardly and is pivotally connected with a foot-piece 73 which is pivoted to the base at 74. Said foot-piece is maintained in its normal raised position by means of a spring, not shown. It will be seen that by pressing down upon the foot-piece 73, the actuator 67 may be operated whenever desired thus opening the connection between the cylinder 38 and the chamber 41 and permitting the platform to descend.

It is obvious that the described invention is susceptible of modification, as parts may be omitted, parts added, and parts modified, without departing from the invention as claimed. For instance, the truck may be motor propelled, and the elevating mechanism could then be operated by the same or by a separate motor.

What I claim as new is:—

1. In a structure of the class described, a fluid-operated jack comprising a ram and a cylinder, a pump, a reservoir, said jack, pump and reservoir being so connected that said pump may draw fluid from said reservoir and force it into said cylinder behind said ram, and said structure being provided also with a passage leading through the wall of said cylinder upon the pressure side of said ram to said reservoir, a valve in said passage, and means for automatically controlling said valve to prevent over-extension of said jack.

2. In a structure of the class described, a fluid-operated jack comprising a ram and a cylinder, a pump, a reservoir, said jack, pump and reservoir being so connected that said pump may draw fluid from said reservoir and force it into said cylinder behind said ram, and said structure being provided also with a passage leading through the wall of said cylinder upon the pressure side of said ram to said reservoir, a valve in said passage, and means for automatically controlling said valve to prevent over-extension of said jack, said valve being also constructed and arranged for operation at the will of the operator to release said jack.

3. In a device of the class described, the combination of a fluid operated jack comprising a ram and a cylinder, a reservoir, a pump provided with a head between it and said jack, and in common with said jack, said pump and jack being alined, and said jack, pump and reservoir being so connected that said pump may draw fluid from said reservoir and force it into said cylinder behind said ram, and said head being provided with a passage leading through the wall of said cylinder upon the pressure side of said ram to said reservoir, a valve in said passage, and means for automatically controlling said valve to prevent over-extension of said jack.

4. In a device of the class described, the combination of a fluid operated jack comprising a ram and a cylinder, a pump, a reservoir, valved means for connecting said jack, pump and reservoir so that said pump may draw fluid from said reservoir and force it into said cylinder at a point behind said ram, said valved means being provided also with a passage leading from the pressure side of said ram, through the wall of said cylinder to said reservoir, a stem-valve in said passage, a spring for closing said valve, a guide in advance of said valve, a spring-retracted plunger guided in said guide and substantially alined with and spaced away from said stem, said plunger extending forwardly toward the outer end of said pump away from said jack, and means to act on said plunger, whereby said plunger may be thrust against said stem to open its valve.

Signed at Holyoke, Mass., this 19th day of June, 1914.

DANIEL E. HENNESSY.

Witnesses:
  ARTHUR L. LEWIS,
  R. T. LYON.